G. J. BAKER.
ASTRONOMICAL APPARATUS.
APPLICATION FILED APR. 22, 1909.

949,348.

Patented Feb. 15, 1910.

UNITED STATES PATENT OFFICE.

GEORGE J. BAKER, OF ROYAL OAK, MICHIGAN.

ASTRONOMICAL APPARATUS.

949,348.  Specification of Letters Patent.  Patented Feb. 15, 1910.

Application filed April 22, 1909. Serial No. 491,469.

*To all whom it may concern:*

Be it known that I, GEORGE J. BAKER, a citizen of the United States, residing at Royal Oak, in the county of Oakland, State of Michigan, have invented certain new and useful Improvements in Astronomical Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an astronomical apparatus, and consists in the construction and arrangement of parts hereinafter more fully set forth and pointed out particularly in the claims.

The object of the invention is to provide an apparatus through the medium of which there may be presented to the eye of the observer, a correct reproduction of the celestial sphere, with the names of the stars, planets, and constellations observable at any given time from our earth, so that by the aid of this device the observer may readily locate and learn the name of any of the celestial bodies and constellations visible in the sky or celestial sphere at the time of making said observation.

The above object is attained by the apparatus illustrated in the accompanying drawing, in which:—

Figure 1:
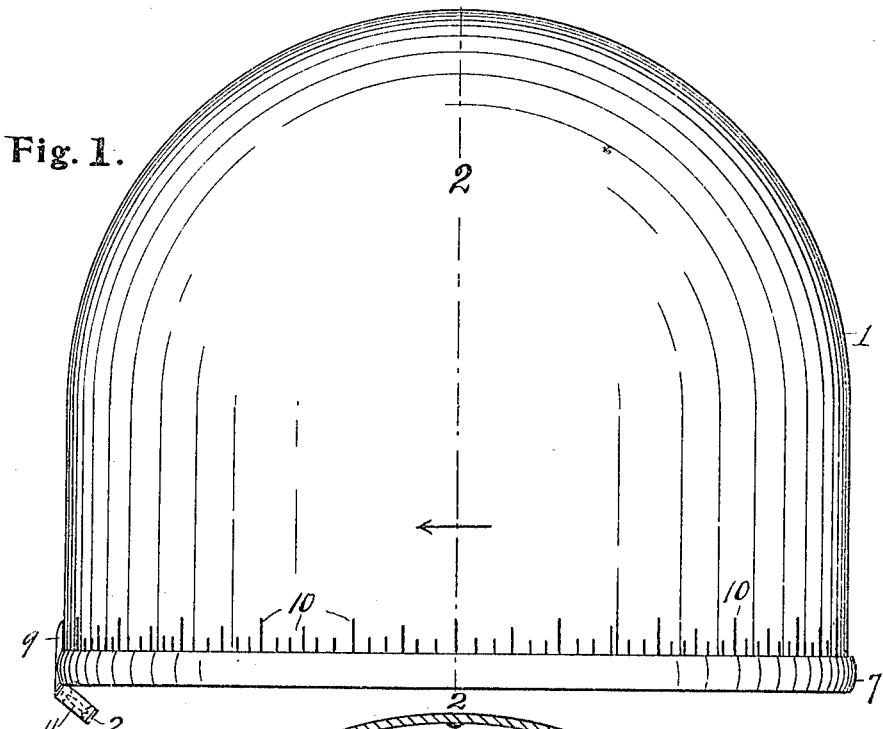
Figure 2:
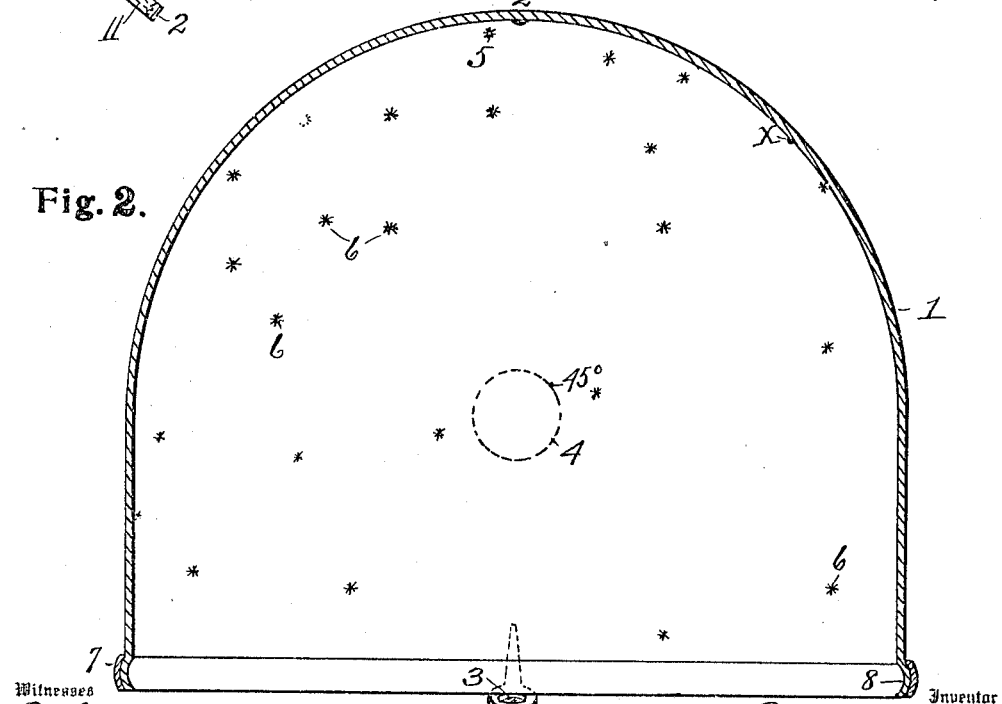

Figure 1 is an elevation of a dome-like body upon the inner concaved wall of which is reproduced a celestial hemisphere. Fig. 2 is a sectional view therethrough as on line 2—2 of Fig. 1.

It is difficult to correctly illustrate a celestial hemisphere upon a flat map, because of the impossibility of correctly arranging the stars, planets, and constellations, and at the same time accurately positioning them with respect to the observer. This difficulty I overcome by placing upon the inner concaved wall of the dome 1 a correct map of the celestial hemisphere visible to the observer, and providing a movable eye-piece 2 having an observation opening 3 through which the observer may be enabled to see that portion of the celestial sphere visible from any given point on our earth at any given time. Our position of latitude on the earth is about 45°.

Assuming that the earth is suspended within the dome or encompassing celestial hemisphere as indicated by dotted line 4 in Fig. 2, the point on the inner concaved wall of the dome which will be directly overhead is the point marked X in said last mentioned figure; that being the point which the eye would strike on looking directly up from our position on the earth, the North star being indicated at 5, and the other stars and constellations being represented by the stars 6. As it is impracticable to view from within the dome the celestial arc visible from our position on the earth, I have provided the movable eye-piece 2 which is so positioned on the rim of the dome as to enable the observer on looking therethrough to bring within the lines of vision, that portion of the celestial arc visible from the earth, and whereon may be seen an exact duplication of the stars, planets, and constellations visible at that time in the heavens, so that if the observer wishes to learn the name of a particular star or a particular group of stars which is visible in the celestial sphere, it is only necessary to adjust the eye-piece 2 to the proper position upon the rim of the dome and look therethrough to see upon the inner arc of the dome a reproduction of said stars and constellations and the names by which they are known.

To render the eye-piece movable, it is attached to a circular band 7 which is mounted to rotate upon a bead 8 formed on the margin of said dome. Connected with said eye-piece is an indicating finger 9 which may be made to register with the graduations 10 on the outer face of the dome, which graduations indicate months, days, and hours; the arrangement being such that by moving said indicating finger to register with the graduation indicating 9 o'clock at night on Saturday, April 24th, and looking through the aperture in the eye-piece 2, there will be presented to the eye of the observer upon the inner arc of the dome, an exact reproduction of the stars visible in the sky at that time.

The dome 1 will be comparatively small so that it may be conveniently carried and in order to render more distinct the celestial bodies upon the inner arc thereof, which necessarily will be considerably reduced in size, the opening 3 through the eye-piece may be provided with a suitable lens 11, shown by dotted lines in Fig. 1, whereby the planets, stars, etc. upon the wall of the dome representing the celestial arc, may be magnified to render them more readily discernible.

By providing for a movement of the eye-piece 2 around the rim of the dome, it may be readily adjusted in accordance with the changing relations between the earth and the celestial regions as said relations change from month to month.

The dome or hemispherical body being open, allows the light to enter so that the celestial map upon the inner wall thereof may at all times be plainly seen.

Having thus fully set forth my invention, what I claim as new and desire to secure by Letters Patent, is:—

1. An astronomical apparatus comprising a dome having a celestial map upon the inner wall thereof, and an eye-piece having an observation opening therethrough, said eye-piece being so positioned as to render visible through said opening that portion of said celestial map corresponding with the celestial sphere visible from a given point on the earth at a given time.

2. An astronomical apparatus comprising a dome-like member having a celestial map upon the inner curved wall thereof, and means associated therewith for rendering visible to an observer that part of said celestial map corresponding with the portion of the celestial sphere visible from a given point on the earth at a given time.

3. An astronomical apparatus comprising a dome-like member having upon the inner wall thereof a celestial map, and an observation device movably associated therewith.

4. An astronomical apparatus comprising a dome-like member having a celestial map upon the inner wall thereof, and an eye-piece movably associated with said member, said eye-piece having an observation opening therethrough.

5. An astronomical apparatus comprising a dome-like member having a celestial map upon the inner wall thereof, and an observation device movably associated therewith, said observation device carrying a magnifying lens.

6. An astronomical apparatus comprising a dome-like member having a celestial map upon the inner wall thereof, and an eye piece movably associated therewith.

7. An astronomical apparatus comprising a dome-like member having a celestial map upon the inner wall thereof, an observation member movably associated therewith, and a scale for indicating the position of said member with respect to time.

8. An astronomical apparatus comprising a dome-like member having a celestial map upon the inner wall thereof, a ring rotatably mounted upon the margin of said member, an eye-piece carried by said ring, and a scale for indicating the position of said eye-piece with respect to time.

In testimony whereof I sign this specification in the presence of two witnesses.

GEORGE J. BAKER.

Witnesses:
E. S. WHEELER,
I. G. HOWLETT.